United States Patent [19]
Grindheim

[11] 3,906,338
[45] Sept. 16, 1975

[54] TWO WIRE CURRENT TRANSMITTER RESPONSIVE TO A RESISTANCE SENSOR INPUT SIGNAL

[75] Inventor: Earl A. Grindheim, Minneapolis, Minn.

[73] Assignee: Rosemount Inc., Minneapolis, Minn.

[22] Filed: Sept. 27, 1974

[21] Appl. No.: 510,015

Related U.S. Application Data

[60] Division of Ser. No. 14,748, Feb. 24, 1970, Pat. No. 3,859,594, which is a continuation of Ser. No. 661,988, Aug. 21, 1967, abandoned.

[52] U.S. Cl. ........ 323/75 N; 73/362 AR; 323/22 T; 323/40; 323/75 F
[51] Int. Cl.² ......................................... G08C 19/04
[58] Field of Search ........ 323/75 F, 75 N, 40, 22 T, 323/16; 73/359, 362 AR

[56] References Cited
UNITED STATES PATENTS

| | | | |
|---|---|---|---|
| 3,085,193 | 4/1963 | Perino | 323/75 N |
| 3,316,765 | 5/1967 | Trolander et al. | 323/75 N |
| 3,319,155 | 5/1967 | Kooiman et al. | 323/75 N |
| 3,413,853 | 12/1968 | Rowell | 323/75 N |
| 3,439,258 | 4/1969 | Leeuwen | 323/75 N |
| 3,503,261 | 3/1970 | Riester et al. | 323/75 N |
| 3,562,729 | 2/1971 | Hurd | 73/359 X |
| 3,859,594 | 1/1975 | Grindheim | 323/75 N |

OTHER PUBLICATIONS

"Pressure Sensor Electronic Converter" by Collins et al., IBM Tech. Disc. Bull. Vol. 9, No. 3, 8/1966 pp. 333-334.

*Primary Examiner*—Gerald Goldberg
*Attorney, Agent, or Firm*—Dugger, Johnson & Westman

[57] ABSTRACT

Circuitry including a resistance sensor is excited by an external power source. A reference voltage is established, the voltage developed across the sensor resistance is compared at an amplifier input with a reference voltage signal and the voltage across a feedback resistor, and the total current drawn through the circuitry adjusts as a function of the sensor resistance to give a balanced amplifier input. Total current may be made a linear function of sensor resistance or a non-linear function by proper selection of certain resistors.

9 Claims, 3 Drawing Figures

TWO WIRE CURRENT TRANSMITTER RESPONSIVE TO A RESISTANCE SENSOR INPUT SIGNAL

CROSS REFERENCE TO RELATED APPLICATIONS

This application is a Division of my copending application Ser. No. 14,748, Filed Feb. 24, 1970, now U.S. Pat. No. 3,859,594 granted Jan. 7, 1975, for Two Wire Current Transmitter Responsive To A Resistance Sensor Input Signal which in turn is a continuation of my application Ser. No. 661,988, Filed Aug. 21, 1967 for Remote Measuring System Utilizing Only Two Wires For Supplying Current To The Sensing Circuitry And Adjusting The Current Flow So That It Is Representative Of A Variable Condition, now abandoned.

BACKGROUND OF THE INVENTION

1. Field of the Invention

This invention relates to modulation or control of an electrical current which is dependent on the resistance of a sensing element where the two wires which carry power to the sensing circuitry are also used as the signal current transmission means. The measurement is one in which direct current power is supplied to remotely located sensing and current modifying circuitry which acts to control the total current flow proportional to a measurand.

2. Description of the Prior Art

The problem of conversion of a measurand (where "measurand" refers to the quantity or physical variable being measured) to an electrical signal and subsequent transmission of that signal to recorder and control equipment which may be located some distance away has been handled in many ways in the past. In general four-wire systems have been used where power is supplied via two of the wires and a voltage signal is transmitted via the other two wires. One of the voltage signal leads may be common to one of the power leads for some of these systems. Such a system typically requires use of an amplifier and/or other signal conditioning equipment at the point of measurement in order to supply an accurate signal representative of the measurand. The advantages of using the same two wires for power supply and information transmission has long been recognized and various designs of transmitting equipment have evolved. The prior art approach for force transducers where direct current power and signals are required has been to supply sufficient current to rebalance the force being measured by current through an electromagnetic arrangement. A small amount of current is routed through a null sensing circuit and amplifier which in turn controls the main current supply to the force balance coil. Such circuitry is widely used in industrial pressure measurements and an example is described in U.S. Pat. No. 3,274,833.

For temperature sensing transmitters self-balancing circuits using a motor driven potentiometer have commonly been used. Examples of various designs which have been developed in the past are given in the chapter titled "Measuring and Transmission Methods" of the book Handbook of Applied Instrumentation, McGraw-Hill Book Co., 1964, Library of Congress Catalog Card No. 62-21926. Those various designs all employ electro-mechanical elements of one type or another, to achieve self-balancing circuitry operating from a resistance signal or thermocouple signal. In almost all cases a two phase motor is relied on to provide adjustment of a potentiometer or variable condenser to achieve a balance condition. In one example, the current from a thermocouple passes through the field of a permanent magnet deflecting a beam against a calibrating spring. Beam deflection is sensed by other circuitry which supplies a high level, direct current signal suitable for transmitting to a recorder. A portion of the signal is shunted through a feedback coil which opposes the force caused by the thermocouple current thereby maintaining a balanced condition.

Since these previous designs have all required electromechanical devices they have the disadvantage of rather slow response, limited life associated with a loss of resolution where frictional contacts are involved, and poor performance under adverse environments such as wide variations in temperature, excessive humidity and dust.

SUMMARY OF THE INVENTION

This invention comprises a resistance network resembling a bridge arrangement including a first resistor which changes resistance in response to a measurand and a second resistor which has one end connected to the output of an amplifier controlled current regulator. The output of the bridge is fed to the amplifier input with the correct polarity to always insure a balanced condition at the amplifier input terminals due to opposing signals arising from the first resistor and the feedback current through the second resistor. The circuit is self-balancing and the total current drawn by the circuit is proportional to the measurand value. In one embodiment linearization of the relation between measurand and total current is provided by having the feedback current effectively adjust the bridge excitation in addition to balancing the bridge.

The resulting circuit does not require electromechanical devices such as rotary or linear motors and is free of the disadvantages of such devices. Conversion or transduction of a measurand signal into a direct current signal is accurately accomplished with a minimum of components resulting in a high performance transmitter having long life and high reliability.

It is therefore a primary object of this invention to provide a nonmechanical self-balancing circuit responsive to a measurand where the total current drawn by the circuit is proportional to the measurand.

BRIEF DESCRIPTION OF THE DRAWINGS

FIG. 3 is a schematic showing an alternate arrangement of some of the basic circuit components.

DESCRIPTION OF THE PREFERRED EMBODIMENTS

Figure 1:
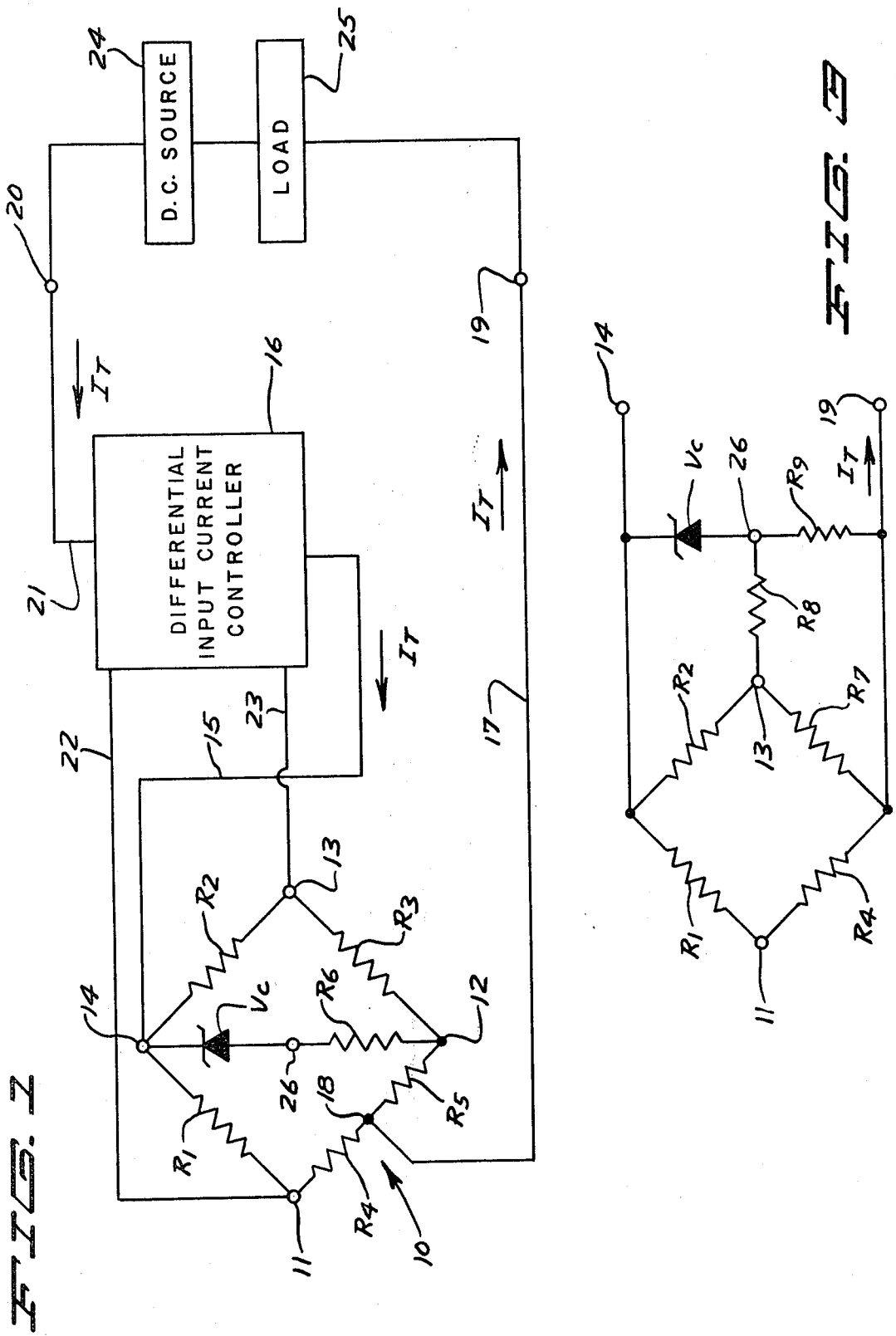
FIG. 1 is a schematic showing the basic circuit of the invention helpful in understanding the invention and the manner in which it is used.

Referring to the drawings and the reference notations thereon FIG. 1 shows a closed series network 10 of resistors $R_1$ through $R_5$ connected in an arrangement which somewhat resembles a conventional bridge. Resistor $R_1$ is adjacent $R_2$ and opposite $R_3$ and the series combination of $R_4$ and $R_5$ is opposite $R_2$ and $R_4$ being connected to $R_1$ at signal output terminal 11 and $R_5$ connected to $R_3$ at junction 12. Signal terminal 13 is between $R_2$ and $R_3$ and the cathod of Zener diode $V_c$ is connected to terminal 14 between $R_1$ and $R_2$. The symbol $V_c$ designates a source of reference voltage having a voltage level of $V_c$ volts. The anode of Zener diode $V_c$ is connected to one end of $R_6$ at terminal 26 and the other end of $R_6$ is connected to junction 12. Total current drawn by the network 10 is designated $I_t$ and is shown as being received by line 15 which connects the output of a differential input current controller 16 to terminal 14. The total current $I_t$ leaves network 10 by line 17 which connects junction 18 between $R_4$ and $R_5$ to power return terminal 19. The total current $I_t$ is supplied to the current controller 16 from input terminal 20 which is connected to 16 by line 21. The signal terminals 11 and 13 connect to current controller 16 by lines 22 and 23 respectively. Controller 16 responds to a voltage difference between lines 22 and 23 in such a manner to reduce any such voltage to substantially zero by adjustment of total current $I_t$ and there is substantially zero current drawn by lines 22 and 23. A direct current source 24 and a load 25 are shown serially connected across terminals 19 and 20.

In operation a change in one or more of the resistors $R_1$ through $R_5$ as a result of a measurand change ("measurand" refers to the quantity or physical variable being measured such as temperate or strain) gives rise to a voltage signal between lines 22 and 23 which causes the controller to adjust the current level $I_t$ to reduce the voltage signal to zero. The change in current $I_t$ is thus a measure of change in resistance of one or more of the resistors $R_1$ through $R_5$ and this change in current is monitored by load 25 which may be a recorder for example. For an understanding of the circuit response assume that $R_6$ is zero. In this case the voltage across terminal 14 and junction 12 is a constant value $V_c$ regardless of the current flow through diode $V_c$. Accordingly the voltage on line 23 is held constant by $V_c$ so long as the ratio between $R_2$ and $R_3$ does not change. Then assuming $R_1$ is constant and $R_4$ is allowed to vary, the voltage on line 22 will rise with an increase in $R_4$. In order to have a self balancing response this increase in voltage on line 22 must give rise to an increase in current $I_t$ from controller 16. The increase in current will not affect the voltage on line 23 (since it is assumed that for this example $R_6$ is zero) however it will have an opposing effect to the voltage on line 22 since it will give a chance in voltage across resistor $R_5$ of opposite sign to the change in voltage across $R_4$ due to the assumed increase in resistance of $R_4$. Then to consider the effects of a finite value of $R_6$ assume $R_6$ to be of value such that the voltage drop across $R_6$ is small compared to $V_c$. Then an increased current through the series combination of $V_c$ and $R_6$, caused by an increase in $R_4$ for example, raises the voltage on line 23 by an amount proportional to the increase in voltage across $R_6$. The same percent increase would also be felt as a part of the voltage change on line 22. Since the voltage on line 22 is assumed to be greater than that on line 23 due to an increase in $R_4$ the effect of the increased voltage across $R_6$ is to require still more current $I_t$ to flow to reduce the voltage difference to zero between lines 22 and 23. Since $R_6$ introduces a correction or adjustment based upon the change in current $I_t$ its effect is a higher order effect and it may be used as such to selectively shape the relation between current $I_t$ and resistor $R_4$ for example. Analysis of the network 10 gives the following expression between $I_t$ and the various resistors shown:

(1) $$I_t = \frac{V_c[R_2(R_4 + R_5) - R_1 R_3]}{R_1[R_5(R_2 + R_3) + R_6(R_3 + R_5)] - R_2 R_4 R_6}$$

It may be noted that if $R_6$ is zero the relation between $I_t$ and $R_4$ is linear and further that if $R_6$ is not zero the current $I_t$ will respond to positive changes in $R_4$ in an increasingly sensitive manner. It may also be noted that an increasing $R_2$ would result in $I_t$ increasing at a less than linear rate if $R_6$ is finite. An increasing $R_1$ or $R_3$ would give a decreasing current $I_t$ and the rate of decrease would reduce whether or not $R_6$ was zero however the magnitude of reduction depends somewhat on $R_6$.

As a further example consider linearization of the relation between $I_t$ and temperature when a platinum resistance thermometer is used as the measurand sensing instrument. Picking $R_4$ as the thermometer the relation between resistance and temperature is (2) $R_4 = R_0(1 + \alpha T - \beta T^2)$ for temperatures zero degress Celsius and higher, where $R_o$ is the resistance at 0° C, T is temperature in degrees Celsius and $\alpha$ and $\beta$ are constants. Substituting expression (2) into expression (1), expanding terms and solving for the condition causing disappearance of terms involving $T^2$ in the numerator gives (3) $$R_6 = \frac{R_2 + R_3}{\frac{R_2}{R_1}\left[\frac{R_0}{R_5} \frac{\alpha^2}{\beta} - 2 - 1\right] - 1}$$

Accordingly it is only necessary to satisfy expression (3) to achieve a linear relation between total current $I_t$ and temperature when a resistance thermometer such as platinum is used as $R_4$. Similar analysis may be made for the case where $R_2$ is a platinum thermometer. If the rate of resistance change as a function of temperature increases, as it does for a nickel wire thermometer for example, the element may be shunted by a constant resistance to linearize the response and it may then be used in place of $R_4$ with a zero value for $R_6$. A thermistor or thermistor network involving a series-shunt combination of resistors having a negative change of resistance with temperature would preferably be used in place of $R_1$ or $R_3$.

In some cases it is desirable to have more than one resistor respond to the measurand. Resistance strain gage measurements commonly employ at least two resistors, one increasing with strain and one decreasing, and these would be preferably located in adjacent positions of network 10. If a temperature difference as sensed by two thermometers having like characteristics is to be measured these resistance thermometers would also be located in adjacent portions of network 10, for example in place of $R_4$ and $R_3$. A range or span adjustment can be conveniently made by adjustment of magnitude of $R_5$ and zero may be adjusted by $R_3$ for example.

In some instances it is desirable to use the circuitry shown for converting a low level voltage signal such as a thermocouple output to a controlled current signal. A thermocouple or other voltage signal may be introduced in series with one of the resistors $R_1$ through $R_5$ or by connection in series with, or across, current controller signal lines 22 and 23. Resistor $R_4$ may be selected to be temperature responsive also so that it serves as a reference junction compensation for a thermocouple having its reference junction adjacent $R_4$. In all such cases the differential input current controller responds to a voltage signal across lines 22 and 23 in such a manner to reduce that voltage to zero and the resulting current drawn by the circuit and available for measurement across load 25 bears a predetermined relation to the voltage signal and its origin.

Figure 2:
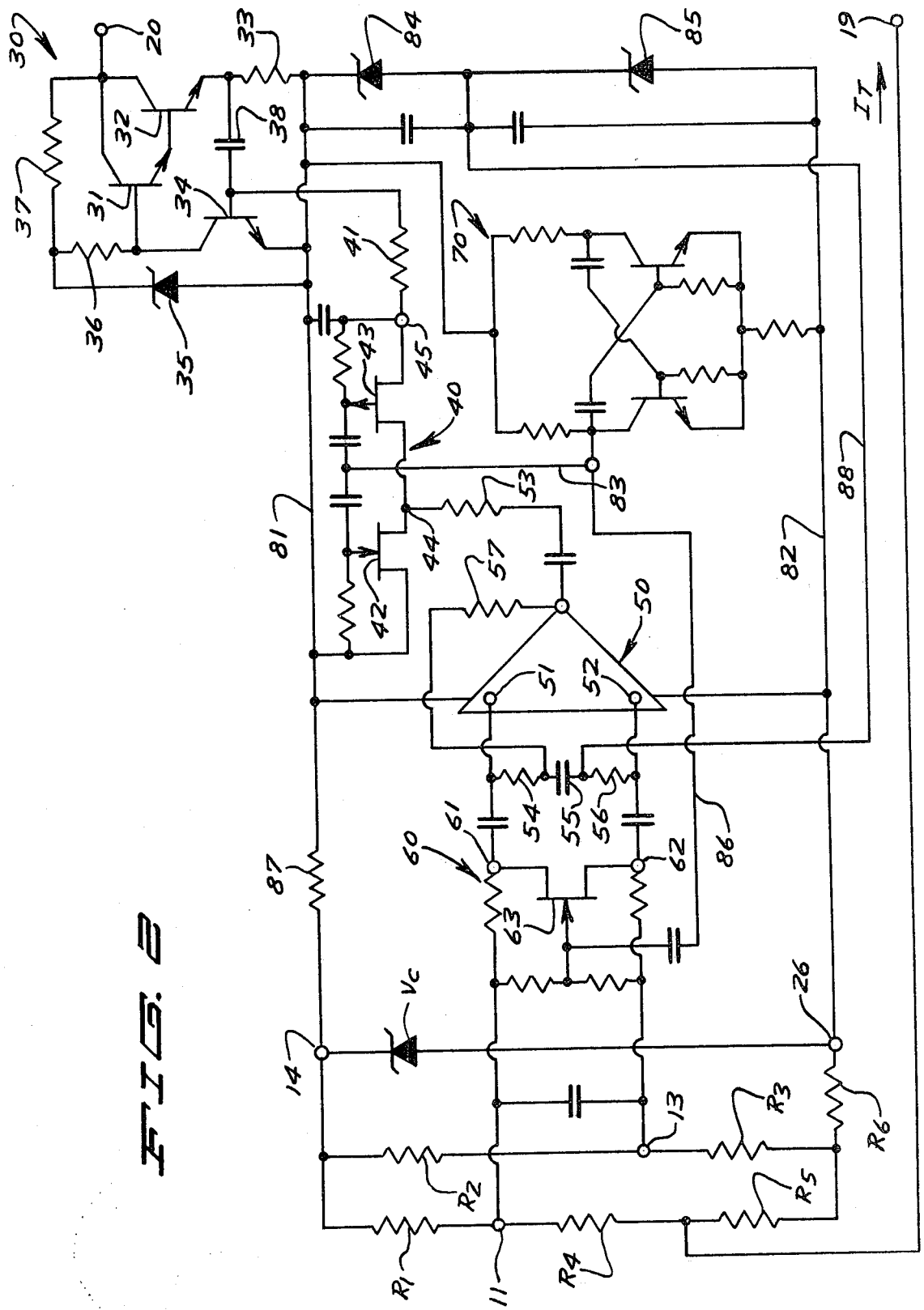
FIG. 2 is a circuit schematic showing details of a preferred embodiment useful for practicing the invention.

A detailed schematic of a differential input controller together with network resistors $R_1$ through $R_6$ and reference voltage $V_c$ is shown in FIG. 2. The system of FIG. 2 is a carrier amplifier type controller giving a high degree of freedom in choice of direct current voltage levels throughout the circuit. While a "straight" DC or non-carrier type controller may be used the carrier amplifier type controller generally gives overall higher performance than would be available with a direct current coupled amplifier.

The network resistors $R_1$ through $R_6$ and reference voltage $V_c$ are connected in FIG. 2 in the same arrangement of FIG. 1 however the main supply of controller feedback current is now delivered to the network at terminal 26 between $R_6$ and the anode of Zener diode $V_c$. The circuit is arranged to receive direct current power at terminal 20 which connects to a current controller stage designated generally at 30. The current is controlled by stage 30 in response to a signal from a demodulator 40 which in turn connects to the output of a differential amplifier 50. Amplifier 50 responds to the signals across network terminals 11 and 13 which are coupled to amplifier 50 by a modulator 60. Modulator 60 and demodulator 40 are synchronously driven by a multivibrator 70 which is a square wae, symmetrical, free-running type multivibrator. The modulator 60 and demodulator 40 may be referred to as choppers and the multivibrator is a specific example of a chopper driver generating a wave form commonly referred to as chopper drive. The total current drawn by the circuit is effective in obtaining a zero voltage difference across network terminals 11 and 13 in the same manner as described with reference to FIG. 1 and consequently the current $I_t$ which would be measured by a serially connected load as was shown in FIG. 1 is accurately described by expression (1) when the circuit is operating in a balanced condition.

Current controller 30 includes a pair of transistors 31 and 32 having their collectors connected to input power terminal 20. These transistors form a Darlington amplifier since the emitter of 32 connects through resistor 33 to power line 81 which line is the main source of power for the other circuit elements. Controller 30 also includes transistor 34 and Zener diode 35 which operate to give a substantially constant current in the base to emitter circuits of 31 and 32 even though the input power supplied to terminal 20 may vary considerably in voltage level. The base of transistor 31 connects to the collector of 34 and connects through resistor 36 to the junctions between the cathode of Zener diode 35 and resistor 37. The other end of resistor 37 connects to input terminal 20. The emitter of transistor 34 and anode of diode 35 connect to line 81 and the base of transistor 34 connects to the output of demodulator 40 through resistor 41. A capacitor 38 is connected between the base of transistor 34 and the emitter of transistor 32 in order to shunt any high frequency components that may appear at transistor 34.

The demodulator 40 includes an N-channel field effect transistor 42 connected in series with a P-channel field effect transistor 42 at junction 44. The source of transistor 42 connects to line 81 and the source of transistor 43 connects to resistor 41 at demodulator output terminal 45. Resistors are respectively connected from gate to source of transistors 42 and 43 and the transistors are alternately made conducting and nonconducting by a capacitively coupled output signal on line 83 which is connected to the output of multivibrator 70. A positive signal on line 83 cuts off transistor 43 and turns on transistor 42 thereby effectively referencing the output of amplifier 50 to power line 81. The alternate negative signal on line 83 cuts off 42 and turns on 43 thereby coupling the output of amplifier 50 to the output terminal 45 of demodulator 40.

Amplifier 50 is a direct current integrated circuit differential amplifier having its output capacitively coupled to resistor 53 and thence to junction 44. Input power is obtained from line 81 and power return is to line 82. Amplifier signal input terminals 51 and 52 are capacitively coupled to modulator output terminals 61 and 62 respectively. The series combination of resistor 54, capacitor 55 and resistor 56 is connected between input terminals 51 and 52. The output of amplifier 50 is D.C. connected to the junction between resistor 54 and capacitor 55 by means of degenerative feedback resistor 57. This degeneration feedback of direct current signals insures that unwanted error signals such as thermoelectric potentials at the input terminals will have little effect on the amplifier control signal. An alternating voltage signal from modulator 60 will be amplified independently by amplifier 50 because of the capacitive coupling of both input and output terminals. The amplifier 50 is operated from a balanced voltage supplied by lines 81 and 82 which is maintained substantially constant by series connected Zener diodes 84 and 85. These diodes are of the same type and same voltage breakdown. The junction between the cathode of 85 and the anode of 84 is connected to the junction between capacitor 55 and resistor 56 at the input to amplifier 50 by line 88 thereby maintaining the input of amplifier 50 midway between the voltage on lines 81 and 82.

Modulator 60 includes field effect transistor 63 which is alternately made conducting and nonconducting by the multivibrator output capacitively coupled to the gate of transistor 63 from line 86. The output connections of transistor 63 connect directly to modulator output terminals 62 and 61 respectively. These output terminals are resistance coupled to network output terminals 11 and 13 respectively so that a D.C. output signal arising at terminals 11 and 13 from a network unbalance is alternately shorted and applied across amplifier terminals 51 and 52 at the frequency established by multivibrator 70.

Multivibrator 70 receives power from lines 81 and has a power return to line 82. The multivibrator includes a pair of transistors oscillating in a continuous manner and, as shown, is of conventional design which requires no elaboration.

The basic operation of the circuit of FIG. 2 is similar to the description given in reference to FIG. 1. Amplifier 50 and current controller 30 function to maintain zero voltage between network terminals 11 and 13 and the total current drawn by the circuit is related to the network resistors $R_1$ through $R_6$ and reference voltage $V_c$ by expression (1). Amplifier 50 and multivibrator 70 are each powered between lines 81 and 82 which are maintained at substantially constant voltage by Zener diodes 84 and 85. Consequently the current component drawn by these elements is active in the network balance since the current return is from line 82 through linearizing resistor $R_6$ and current feedback resistor $R_5$ to output terminal 19. This current component is typically small and relatively constant and the main signal current is developed by virtue of a network unbalance resulting in a change in current through Zener diodes 84 and 85 and thence over line 82 through resistors $R_6$ and $R_5$ to output terminal 19. Resistor 87 couples power from line 81 to the cathode of reference source $V_c$ which in turn supplies the network in the manner described with reference to FIG. 1. Resistor 87 substantially blocks the balancing current supplied from controller 30 from passing through reference element $V_c$ thereby minimizing any change in $V_c$ which might otherwise be caused by relatively large changes in current through $V_c$.

As an example of operability it was desired to deliver an output current varying from 10 to 50 milliamps for a temperature change from 0° C to 100° C as measured byy a platinum resistance thermometer. A sensor resistance of nominally 100 ohms at 0° C was selected and was simulated by a manually variable resistor substituted for $R_4$. Other network resistor values were 1.008 ohms for $R_5$, 2.26 ohms for $R_6$, 90.78 ohms for $R_3$ and 6187.2 ohms for each of $R_1$ and $R_2$. Reference source $V_c$ was a TN-827 Zener diode having a nominal voltage of 6.2 volts and Zener diodes 84 and 85 were type IN-4739 controlling at about 8.4 volts each. Resistor 87 was 1850 ohms and the input voltage from the D.C. source 24 was approximately 60 volts. Amplifier 50 was a type 709C direct current operational amplifier manufactured by Fairchild Semi-conductor, Mountain View, California and the other components were of size and type to maintain the various circuit elements within their design ranges of operation.

When resistance $R_4$ was varied to correspond to the well known resistance change of platinum with temperature the results of Table 1 were obtained.

TABLE 1

| Simulated Temperature | Resistance $R_4$ | Current $I_t$ |
|---|---|---|
| 0 deg. C | 100.00 ohms | 10.000 ma |
| 25 deg. C | 109.92 ohms | 19.999 ma |
| 50 deg. C | 119.77 ohms | 30.000 ma |
| 75 deg. C | 129.55 ohms | 40.004 ma |
| 100 deg. C | 139.25 ohms | 50.001 ma |

The results in Table 1 are one example of the close agreement which is obtained between a measurand and output current for the circuits herein disclosed. Although the example was for a current range of 10–50 ma for a 100 ohm temperature sensor and a 100° C range it is apparent that the circuits are suitable for operation over a wide range of variables and the current range achieved may also be selected over a wide range while using the circuits which are described and illustrated herein.

An alternate schematic of the general network 10 shown in FIG. 1 is shown in FIG. 3. The network of FIG. 3 is substantially equivalent to network 10 and the operation follows the same formula relating total current, reference source $V_c$ and the resistors making up the network. The network of FIG. 3 was derived from 10 by transformation of the "wye" circuit comprising $R_3$, $R_5$, and $R_6$ of FIG. 1 to the "delta" circuit comprising resistors, $R_7$, $R_8$, and $R_9$ of FIG. 3. Expression (1) may also be applied to the network arrangement of FIG. 3 where the following transformations apply:

(4) $$R_7 = \frac{R_5 R_6 + R_5 R_3 + R_3 R_6}{R_6}$$

(5) $$R_8 = \frac{R_5 R_6 + R_5 R_3 + R_3 R_6}{R_5}$$

(6) $$R_9 = \frac{R_5 R_6 + R_5 R_3 + R_3 R_6}{R_3}$$

The network arrangement of FIG. 3 may be substituted directly into the circuit of FIG. 1 or the circuit of FIG. 2 by connecting terminals 11, 13, 14 and 19 to the terminals of like numbers in FIG. 1 or FIG. 2 and disconnecting the corresponding networks shown in those Figures. The current derived from differential input current controller 16 may be applied directly to terminal 14 as shown in FIG. 1 but in the preferred embodiment the major portion of the controlled current is delivered to the network at terminal 26 as was shown in the circuit description of FIG. 2.

What is claimed is:

1. An electrical network comprising six resistors and a source of constant voltage and having first and second signal output terminals, a current input terminal and a current output terminal and means providing a source of current to said current input terminals, wherein the six resistors designated $R_1$ through $R_6$ and source designated $V_c$ are connected to be equivalent to an arrangement having $R_1$, $R_2$, $R_3$, $R_4$, $R_5$ connected in a closed series loop in the order cited having the first and second signal output terminals between $R_1$ and $R_4$ and between $R_2$ and $R_3$ respectively, the current input terminal between $R_1$ and $R_2$, and the current output terminal between $R_4$ and $R_5$, and the source $V_c$ serially connected with $R_6$ from a junction between $R_1$ and $R_2$ to a junction between $R_3$ and $R_5$, and connecting means to deliver a variable current from said current source to a junction between $V_c$ and $R_6$ so that the total current designated $I_T$ delivered to the network which results in zero voltage difference at the first and second signal output terminals is $$I_T = \frac{V_c[R_2(R_4+R_5) - R_1R_3]}{R_1[R_5(R_2+R_3) + R_6(R_3+R_5)] - R_2R_4R_6}$$

2. In a current transmitter having a current control circuit, a resistance bridge network comprising first, second, third and fourth resistance means connected in a closed series loop to provide first and second excitation junctions and first and second output signal junctions, a voltage reference element and fifth resistance means connected in series between said first and second excitation junctions, said voltage reference element and said fifth resistance means providing a third junction therebetween, said current control circuit including means responsive to voltages at said signal junctions to control the current through the third junction to thereby change the voltage across said fifth resistance means and the voltage to said excitation junctions.

3. The resistance bridge network of claim 2 in which said first excitation junction is located between said first and second resistance means and said second excitation junction is located between said third and fourth resistance means, and in which said first output signal junction is located between said first and third resistance means and said second output signal junction is located between said second and fourth resistance means.

4. The resistance bridge network of claim 3 in which said first excitation junction constitutes a first current terminal, and in which said third resistance means includes first and second resistors joined together, the junction of which constitutes a second current terminal.

5. The resistance bridge network of claim 3 in which said first and second excitation junctions constitute first and second current terminals, and a resistor connected between said second output signal junction and said third junction between said voltage reference element and said fifth resistance means.

6. In a current transmitter, a resistance bridge network comprising first and second current terminals, first and second signal terminals, a first resistor having one end connected to said first current terminal and its other end to said first signal terminal second resistor having one end connected to said first current terminal and its other end to said second signal terminal, a third resistor having one end connected to said first signal terminal and its other end to said second current terminal, a fourth resistor connected at one end to said second signal terminal, a fifth resistor connected at one end to said second current terminal, the other ends of said fourth and fifth resistors being connected together, a voltage reference element, a sixth resistor connected at one end to one end of said voltage reference element, and the other ends of said voltage reference element and said sixth resistor respectively being connected to the other ends of said fourth and fifth resistors and to said first current terminal.

7. The resistance bridge network of claim 6 in which said third resistor varies with respect to a varying measurand.

8. In a current transmitter, a resistance bridge network comprising first and second current terminals, first and second signal terminals, a first resistor having one end connected to said first current terminal and its other end to said first signal terminal, a second resistor having one end connected to said first current terminal and its other end to said second signal terminal, a third resistor having one end connected to said first signal terminal and its other end to said second current terminal, a fourth resistor connected at one end to said second signal terminal and its other end to said second current terminal, a fifth resistor connected at one end to said second signal terminal, a voltage reference element connected at one end to said first current terminal, a sixth resistor connected at one end to said second current terminal and its other end to the other ends of said fifth resistor and said voltage reference element at a junction, said current transmitter including a current supply circuit providing a current through said junction in response to voltages at the first and second signal terminals.

9. The resistance bridge network of claim 8 in which said third resistor varies with respect to a varying measurand.

* * * * *

UNITED STATES PATENT AND TRADEMARK OFFICE
CERTIFICATE OF CORRECTION

PATENT NO. : 3,906,338
DATED : September 16, 1975
INVENTOR(S) : Earl A. Grindheim It is certified that error appears in the above-identified patent and that said Letters Patent are hereby corrected as shown below:

Column 3, line 48 "chance" should be--change--. Column 5, line 37 "wae" should be--wave--. Column 6, line 6 "42" should be--43--. Column 7, line 28 "byy" should be--by--; Column 7, line 35 "TN-827" should be--IN-827--. Column 8, line 39 "terminals" should be--terminal--. Column 9, line 32 (Claim 6, line 5) after first signal terminal insert--, a--.

Signed and Sealed this twenty-third Day of December 1975

[SEAL]

Attest:

RUTH C. MASON
Attesting Officer

C. MARSHALL DANN
Commissioner of Patents and Trademarks